United States Patent [19]

Takada et al.

[11] Patent Number: 5,733,831
[45] Date of Patent: Mar. 31, 1998

[54] CERAMIC DIELECTRICS AND METHODS FOR FORMING THEM

[75] Inventors: Takahiro Takada, Amagasaki; Akihiro Koga, Nishinomiya, both of Japan

[73] Assignee: Sumitomo Metal Industries, Ltd., Osaka, Japan

[21] Appl. No.: 809,073

[22] PCT Filed: Sep. 14, 1995

[86] PCT No.: PCT/JP95/01851

§ 371 Date: Mar. 14, 1997

§ 102(e) Date: Mar. 14, 1997

[87] PCT Pub. No.: WO96/09264

PCT Pub. Date: Mar. 28, 1996

[30] Foreign Application Priority Data

Sep. 20, 1994 [JP] Japan .................. 6-225007
May 9, 1995 [JP] Japan .................. 7-110575
May 9, 1995 [JP] Japan .................. 7-110846

[51] Int. Cl.$^6$ .................. C04B 35/495; C04B 35/00
[52] U.S. Cl. .................. 501/135; 501/136
[58] Field of Search .................. 501/135, 136

[56] References Cited

U.S. PATENT DOCUMENTS

| 5,484,753 | 1/1996 | Kagata et al. | 501/136 |
| 5,525,562 | 6/1996 | Kagata et al. | 501/136 |
| 5,629,252 | 5/1997 | Nishimoto et al. | 501/136 |

FOREIGN PATENT DOCUMENTS

| 54-77000 | 6/1979 | Japan . |
| 56-96769 | 8/1981 | Japan . |
| 59-48484 | 11/1984 | Japan . |
| 61-19004 | 1/1986 | Japan . |

OTHER PUBLICATIONS

"Preparation and Dielectric Properties of Ba(Zn1/3 Ta2/3)O3–Ba(Zn1/3 Nb2/3)O3 Ceramics Modified with Certain Additives," Ohuchi et al., J. Soc. Mat. Sci., Japan, vol. 43, No. 489, pp. 629–634, Jun. 1994.

Primary Examiner—Deborah Jones
Attorney, Agent, or Firm—Lane, Aitken & McCann

[57] ABSTRACT

The present invention provides ceramic dielectrics for use in electronic components and the subsequent methods of forming them. In the ceramic dielectrics, $CaTiO_3$ or $MgTiO_3$ and/or $SrTiO_3$ are incorporated in a $Ba(Zn_{1/3}, Ta_{2/3})O_3$-base or a $Ba(Mg_{1/3}, Ta_{2/3})O_3$-base ceramics. In addition, $SiO_2$ and/or $B_2O_3$, MnO and/or ZnO may be added as additives. The ceramic dielectrics have large unloaded Q-value and high relative dielectric constant, and a small temperature coefficient of resonant frequency.

Each of the ceramic dielectrics can be easily formed at a lower sintering temperature (1200°~1650° C.) than usual.

9 Claims, 18 Drawing Sheets

Figure 1

| Sample No. | Base sample | y molar ratio | z molar ratio | Sintering temp. (°C) | Forming conditions | Q (at 8GHz) | ε r | τ f (ppm/°C) | Note |
|---|---|---|---|---|---|---|---|---|---|
| 10 | ① | 0.0010 | ZnO 0.0001 | 1550 | a | 19000 | 30 | -2.5 | |
| 11 | " | " | " 0.0010 | " | " | 17000 | 31 | -1.4 | |
| 12 | " | " | " 0.0100 | " | " | 15000 | 32 | +2.7 | |

Note 1: In the column "Base sample", ① refer to Ba(Zn$_{1/3}$、Ta$_{2/3}$)O$_3$.

Note 2: y and z refer to, respectively, the corresponding letters in Ba(M$_{1/3}$、Ta$_{2/3}$)O$_3$ +yCaTiO$_3$+zMnO/ZnO(wherein M represents Zn or Mg).

Note 3: In the column "Forming conditions", "a" means that the preparation of the raw materials has been conducted by using all the raw material powders.

Figure 2

| Sample No. | Base sample | y molar ratio | z molar ratio | | Sintering temp. (°C) | Forming conditions | Q (at 8GHz) | $\varepsilon_r$ | $\tau_f$ (ppm/°C) | Note |
|---|---|---|---|---|---|---|---|---|---|---|
| 13 | ① | 0.0010 | ZnO | 0.0500 | 1550 | a | 11000 | 28 | +11.5 | |
| 14 | " | " | " | 0.0700 | " | " | 3000 | 24 | +75.0 | * |
| 15 | " | " | MnO | 0.0001 | " | " | 18000 | 29 | −1.5 | |
| 16 | " | " | " | 0.0010 | " | " | 16000 | 30 | +2.1 | |
| 17 | " | " | " | 0.0100 | " | " | 14000 | 31 | +7.9 | |
| 18 | " | " | " | 0.0500 | " | " | 15000 | 25 | +15.8 | |
| 19 | " | " | " | 0.0700 | " | " | # | # | # | * |

Note 1: In the column "Base sample", ① refer to Ba(Zn$_{1/3}$,Ta$_{2/3}$)O$_3$.

Note 2: y and z refer to, respectively, the corresponding letters in Ba(M$_{1/3}$,Ta$_{2/3}$)O$_3$ +yCaTiO$_3$+zMnO/ZnO(wherein M represents Zn or Mg).

Note 3: In the column "Forming conditions", "a" means that the preparation of the raw materials has been conducted by using all the raw material powders.

Note 4: The symbol # means that the measurement has failed owing to the dissolution of the sample, or for other reasons.

Note 5: The symbol * means that the samples have compositions outside the scope of the invention.

Figure 3

| Sample No. | Base sample | y molar ratio | z molar ratio | Sintering temp. (°C) | Forming conditions | Q (at 8GHz) | ε' | τ' (ppm/°C) | Note |
|---|---|---|---|---|---|---|---|---|---|
| 35 | ② | 0.0010 | ZnO 0.0001 | 1550 | a | 16000 | 32 | +2.1 | |
| 36 | 〃 | 〃 | 〃 0.0010 | 〃 | 〃 | 17000 | 31 | +5.1 | |

Note 1: In the column "Base sample", ② refer to Ba(Mg$_{1/3}$,Ta$_{2/3}$)O$_3$.

Note 2: y and z refer to, respectively, the corresponding letters in Ba(M$_{1/3}$,Ta$_{2/3}$)O$_3$ +yCaTiO$_3$+zMnO/ZnO(wherein M represents Zn or Mg).

Note 3: In the column "Forming conditions", "a" means that the preparation of the raw materials has been conducted by using all the raw material powders.

Figure 4

| Sample No. | Base sample | y molar ratio | z molar ratio | | Sintering temp. (°C) | Forming conditions | Q (at 8GHz) | $\varepsilon_r$ | $\tau_f$ (ppm/°C) | Note |
|---|---|---|---|---|---|---|---|---|---|---|
| 37 | ② | 0.0010 | ZnO | 0.0100 | 1550 | a | 15000 | 30 | +6.5 | |
| 38 | 〃 | 〃 | 〃 | 0.0500 | 〃 | 〃 | 14000 | 27 | +17.8 | |
| 39 | 〃 | 〃 | 〃 | 0.0700 | 〃 | 〃 | 6500 | 20 | +39.5 | * |
| 40 | 〃 | 〃 | MnO | 0.0001 | 〃 | 〃 | 12000 | 30 | +9.0 | |
| 41 | 〃 | 〃 | 〃 | 0.0010 | 〃 | 〃 | 13000 | 31 | +10.1 | |
| 42 | 〃 | 〃 | 〃 | 0.0100 | 〃 | 〃 | 11000 | 32 | +17.5 | |
| 43 | 〃 | 〃 | 〃 | 0.0500 | 〃 | 〃 | 10000 | 25 | +20.0 | |
| 44 | 〃 | 〃 | 〃 | 0.0700 | 〃 | 〃 | # | # | # | * |

Note 1: In the column "Base sample", ② refer to $Ba(M_{1/3},Ta_{2/3})O_3$.

Note 2: y and z refer to, respectively, the corresponding letters in $Ba(M_{1/3},Ta_{2/3})O_3 + yCaTiO_3 + zMnO/ZnO$ (wherein M represents Zn or Mg).

Note 3: In the column "Forming conditions", "a" means that the preparation of the raw materials has been conducted by using all the raw material powders.

Note 4: The symbol # means that the measurement has failed owing to the dissolution of the sample, or for other reasons.

Note 5: The symbol * means that the samples have compositions outside the scope of the invention.

Figure 5

| Sample No. | Base sample | y molar ratio | z molar ratio | Sintering temp. (°C) | Forming conditions | Q (at 8GHz) | $\varepsilon_r$ | $\tau_f$ (ppm/°C) | Note |
|---|---|---|---|---|---|---|---|---|---|
| 58 | ① | 0.0010 | ZnO 0.0010 | 1550 | b | 20000 | 30 | -2.3 | |
| 59 | 〃 | 〃 | MnO 0.0010 | 〃 | 〃 | 19000 | 30 | -1.8 | |

Note 1: In the column "Base sample", ① refer to Ba($M_{1/3}$,$Ta_{2/3}$)$O_3$.

Note 2: y and z refer to, respectively, the corresponding letters in Ba($M_{1/3}$,$Ta_{2/3}$)$O_3$ +yCaTiO$_3$+zMnO/ZnO(wherein M represents Zn or Mg).

Note 3: In the column "Forming conditions", "b" means that CaTiO$_3$ has been mixed in the form of calcined powder.

Figure 6
(a)
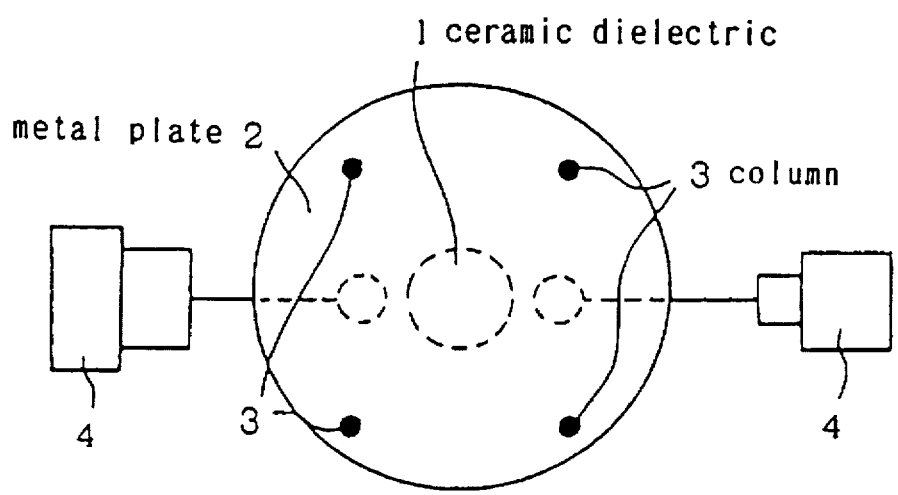
(b)
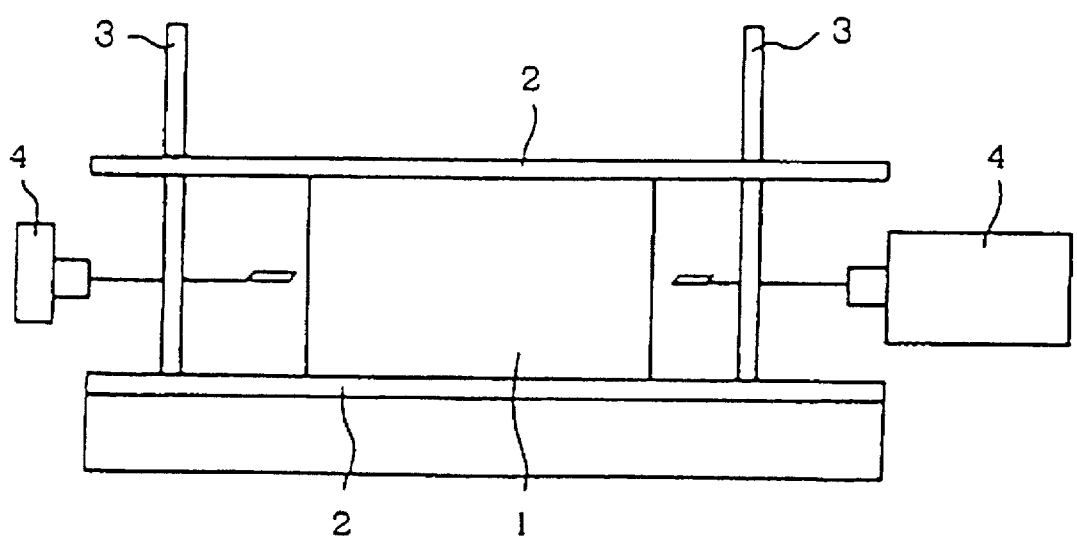

Figure 7

| Sample No. | Base sample | x molar ratio | y molar ratio | z molar ratio | Sintering conditions Temp.×Time (°C) (hr) | Forming condi- tions | Q (at 8GHz) | ε' | τ' (ppm/°C) | Note |
|---|---|---|---|---|---|---|---|---|---|---|
| 61 | ③ | 0.85 | 0.005 | SiO₂ 0.001 | 1500×4 | c | 4000 | 28 | +15.2 | * |
| 62 | " | 0.90 | " | " | " | " | 11000 | 28 | +14.9 | |
| 63 | " | 0.95 | " | " | " | " | 10500 | 30 | +11.0 | |
| 64 | " | 1.00 | " | " | " | " | 12000 | 29 | +6.7 | |
| 65 | " | 1.05 | " | " | " | " | 11500 | 31 | +6.6 | |
| 66 | " | 1.10 | " | " | " | " | 10300 | 33 | +7.5 | |
| 67 | " | 1.15 | " | " | " | " | 3600 | 37 | +12.0 | * |
| 68 | " | 1.00 | 0 | " | " | " | 12500 | 26 | +3.0 | * |
| 69 | " | " | 0.0001 | " | " | " | 11900 | 28 | −2.8 | |
| 70 | " | " | 0.001 | " | " | " | 11000 | 30 | +0.9 | |

Note 1: In the column "Base sample", ③ refer to $Ba_x(Zn_{1/3},Ta_{2/3})O_3$.

Note 2: x, y and z refer to, respectively, the corresponding letters in $Ba_x(M_{1/3},Ta_{2/3})O_3+yCaTiO_3+zSiO_2/B_2O_3$ (wherein M represents Zn or Mg).

Note 3: In the column "Forming conditions", "c" means that the preparation of the raw materials has been conducted by using all the raw material powders.

Note 4: The symbol * means that the samples have compositions outside the scope of the invention.

Figure 8

| Sample No. | Base sample | x molar ratio | y molar ratio | z molar ratio | Sintering conditions Temp.×Time (°C) (hr) | Forming conditions | Q (at 8GHz) | $\varepsilon_r$ | $\tau_f$ (ppm/°C) | Note |
|---|---|---|---|---|---|---|---|---|---|---|
| 71 | ③ | 1.00 | 0.01 | SiO₂ 0.001 | 1500×4 | c | 11300 | 32 | +3.1 | |
| 72 | 〃 | 〃 | 0.1 | 〃 | 〃 | 〃 | 10600 | 36 | +12.0 | |
| 73 | 〃 | 〃 | 0.3 | 〃 | 〃 | 〃 | 10100 | 38 | +19.0 | |
| 74 | 〃 | 〃 | 0.35 | 〃 | 〃 | 〃 | 2700 | 40 | +35.0 | * |
| 75 | 〃 | 〃 | 0.5 | 〃 | 〃 | 〃 | # | # | # | * |
| 76 | 〃 | 〃 | 0.005 | 0 | 〃 | 〃 | 8100 | 27 | +8.0 | * |
| 77 | 〃 | 〃 | 〃 | SiO₂ 0.0001 | 〃 | 〃 | 10000 | 29 | +7.2 | |
| 78 | 〃 | 〃 | 〃 | 〃 0.005 | 〃 | 〃 | 11000 | 30 | +4.9 | |
| 79 | 〃 | 〃 | 〃 | 〃 0.01 | 〃 | 〃 | 10300 | 22 | −0.5 | |
| 80 | 〃 | 〃 | 〃 | 〃 0.03 | 〃 | 〃 | 11100 | 35 | +11.0 | |

Note 1: In the column "Base sample", ③ refer to $Ba_x(Zn_{1/3},Ta_{2/3})O_3$.

Note 2: x, y and z refer to, respectively, the corresponding letters in $Ba_x(M_{1/3},Ta_{2/3})O_3+yCaTiO_3+zSiO_2/B_2O_3$ (wherein M represents Zn or Mg).

Note 3: In the column "Forming conditions", "c" means that the preparation of the raw materials has been conducted by using all the raw material powders.

Note 4: The symbol # means that the measurement has failed owing to the dissolution of the sample, or for other reasons.

Note 5: The symbol * means that the samples have compositions outside the scope of the invention.

Figure 9

| Sample No. | Base sample | x molar ratio | y molar ratio | z molar ratio | Sintering conditions Temp.×Time (°C) (hr) | Forming condi-tions | Q (at 8GHz) | $\varepsilon_r$ | $\tau_f$ (ppm/°C) | Note |
|---|---|---|---|---|---|---|---|---|---|---|
| 81 | ③ | 1.00 | 0.005 | $SiO_2$ 0.05 | 1500×4 | c | 10200 | 37 | +16.0 | |
| 82 | ″ | ″ | ″ | ″ 0.06 | ″ | ″ | 7500 | 36 | +41.0 | * |
| 83 | ″ | ″ | ″ | ″ 0.001 | 1150×4 | ″ | 300 | 40 | +45.0 | * |
| 84 | ″ | ″ | ″ | ″ 0.01 | ″ | ″ | 280 | 39 | +39.0 | * |
| 85 | ″ | ″ | ″ | ″ 0.001 | 1200×4 | ″ | 10100 | 33 | +19.0 | |
| 86 | ″ | ″ | ″ | ″ | 1300×4 | ″ | 11000 | 31 | +11.3 | |
| 87 | ″ | ″ | ″ | ″ | 1400×4 | ″ | 11300 | 29 | +10.8 | |
| 88 | ″ | ″ | ″ | ″ | 1450×4 | ″ | 12200 | 29 | +10.2 | |
| 89 | ″ | ″ | ″ | ″ | 1600×4 | ″ | 11900 | 30 | +12.1 | |
| 90 | ″ | ″ | ″ | ″ | 1650×4 | ″ | # | # | # | * |

Note 1: In the column "Base sample", ③ refer to $Ba_x(Zn_{1/3}Ta_{2/3})O_3$.

Note 2: x, y and z refer to, respectively, the corresponding letters in $Ba_x(M_{1/3}Ta_{2/3})O_3 + yCaTiO_3 + zSiO_2/B_2O_3$ (wherein M represents Zn or Mg).

Note 3: In the column "Forming conditions", "c" means that the preparation of the raw materials has been conducted by using all the raw material powders.

Note 4: The symbol # means that the measurement has failed owing to the dissolution of the sample, or other reasons.

Note 5: The symbol * means that the samples have compositions outside the scope of the invention.

Figure 10

| Sample No. | Base sample | x molar ratio | y molar ratio | z molar ratio | | Sintering conditions Temp.×Time (°C) (hr) | Forming conditions | Q (at 8GHz) | $\varepsilon_r$ | $\tau_f$ (ppm/°C) | Note |
|---|---|---|---|---|---|---|---|---|---|---|---|
| 91 | ③ | 1.00 | 0.005 | $B_2O_3$ | 0.001 | 1500× 4 | c | 11000 | 28 | +2.1 | |
| 92 | 〃 | 〃 | 〃 | 〃 | 0.005 | 〃 | 〃 | 10500 | 29 | +5.5 | |
| 93 | 〃 | 〃 | 〃 | 〃 | 0.01 | 〃 | 〃 | 10600 | 34 | +16.9 | |
| 94 | 〃 | 〃 | 〃 | 〃 | 0.05 | 〃 | 〃 | 11200 | 35 | +19.7 | |
| 95 | 〃 | 〃 | 〃 | 〃 | 0.06 | 〃 | 〃 | 7000 | 33 | +31.0 | * |
| 96 | 〃 | 〃 | 〃 | 〃 | 0.001 | 1150× 4 | 〃 | 1000 | 34 | +35.0 | * |
| 97 | 〃 | 〃 | 〃 | 〃 | 0.01 | 〃 | 〃 | 1200 | 33 | +39.0 | * |
| 98 | 〃 | 〃 | 〃 | 〃 | 0.001 | 1200× 4 | 〃 | 10000 | 31 | +15.0 | |
| 99 | 〃 | 〃 | 〃 | 〃 | 〃 | 1300× 4 | 〃 | 10300 | 30 | +8.1 | |
| 100 | 〃 | 〃 | 〃 | 〃 | 〃 | 1450× 4 | 〃 | 11200 | 29 | +3.0 | |

Note 1: In the column "Base sample", ③ refer to $Ba_x(Zn_{1/3},Ta_{2/3})O_3$.

Note 2: x, y and z refer to, respectively, the corresponding letters in $Ba_x(M_{1/3},Ta_{2/3})O_3$ +$yCaTiO_3$ +$zSiO_2/B_2O_3$(wherein M represents Zn or Mg).

Note 3: In the column "Forming conditions", "c" means that the preparation of the raw materials has been conducted by using all the raw material powders.

Note 4: The symbol * means that the samples have compositions outside the scope of the invention.

Figure 11

| Sample No. | Base sample | x molar ratio | y molar ratio | z molar ratio | Sintering conditions Temp.×Time (°C) (hr) | Forming conditions | Q (at 8GHz) | ε, | τ, (ppm/°C) | Note |
|---|---|---|---|---|---|---|---|---|---|---|
| 101 | ③ | 1.00 | 0.005 | B₂O₃ 0.001 | 1550×4 | c | 11100 | 29 | +2.5 | |
| 102 | " | " | " | " | 1600×4 | " | 10800 | 29 | +2.8 | |
| 103 | " | " | " | " | 1650×4 | " | # | # | # | * |
| 104 | " | " | " | SiO₂ 0.001 | 1150×4 | d | 450 | 39 | +39.0 | * |
| 105 | " | " | " | " | 1200×4 | " | 10600 | 33 | +18.5 | |
| 106 | " | " | " | " | 1600×4 | " | 12000 | 30 | +11.9 | |
| 107 | " | " | " | " | 1650×4 | " | # | # | # | * |
| 108 | ④ | 0.85 | " | " | 1500×4 | c | 2800 | 27 | +11.2 | * |
| 109 | " | 0.90 | " | " | " | " | 10900 | 28 | +9.1 | |
| 110 | " | 1.00 | " | " | " | " | 11400 | 29 | +5.0 | |

Note 1: In the column "Base sample", ③ and ④ refer to, respectively, Ba$_x$(Zn$_{1/3}$,Ta$_{2/3}$)O$_3$ and Ba$_x$(Mg$_{1/3}$,Ta$_{2/3}$)O$_3$.

Note 2: x, y and z refer to, respectively, the corresponding letters in Ba$_x$(M$_{1/3}$,Ta$_{2/3}$)O$_3$+yCaTiO$_3$+zSiO$_2$/B$_2$O$_3$ (wherein M represents Zn or Mg).

Note 3: In the column "Forming conditions", "c" means that the preparation of the raw materials has been conducted by using all the raw material powders, and "d" means that CaTiO$_3$ has been mixed in the form of calcined powder.

Note 4: The symbol # means that the measurement has failed owing to the dissolution of the sample, or other reasons.

Note 5: The symbol * means that the samples have compositions outside the scope of the invention.

Figure 12

| Sample No. | Base sample | x molar ratio | y molar ratio | z molar ratio | Sintering conditions Temp.×Time (°C) (hr) | Forming conditions | Q (at 8GHz) | $\varepsilon_r$ | $\tau_f$ (ppm/°C) | Note |
|---|---|---|---|---|---|---|---|---|---|---|
| 111 | ④ | 1.10 | 0.005 | SiO₂ 0.001 | 1500×4 | c | 10200 | 32 | +5.2 | |
| 112 | " | 1.15 | " | " | " | " | 4200 | 30 | +6.9 | * |
| 113 | " | 1.00 | 0 | " | " | " | 6300 | 24 | +28.0 | * |
| 114 | " | " | 0.0001 | " | " | " | 10000 | 28 | +20.0 | |
| 115 | " | " | 0.01 | " | " | " | 11100 | 30 | +5.1 | |
| 116 | " | " | 0.1 | " | " | " | 10300 | 32 | +11.0 | |
| 117 | " | " | 0.3 | " | " | " | 10100 | 35 | +19.0 | |
| 118 | " | " | 0.35 | " | " | " | 4100 | 37 | +25.0 | * |
| 119 | " | " | 0.005 | 0 | " | " | 6900 | 25 | +5.4 | * |
| 120 | " | " | " | SiO₂ 0.01 | " | " | 10600 | 28 | +12.0 | |

Note 1: In the column "Base sample", ④ refer to $Ba_x(Mg_{1/3}, Ta_{2/3})O_3$.

Note 2: x, y and z refer to, respectively, the corresponding letters in $Ba_x(M_{1/3}, Ta_{2/3})O_3 + yCaTiO_3 + zSiO_2/B_2O_3$ (wherein M represents Zn or Mg).

Note 3: In the column "Forming conditions", "c" means that the preparation of the raw materials has been conducted by using all the raw material powders.

Note 4: The symbol * means that the samples have compositions outside the scope of the invention.

Figure 13

| Sample No. | Base sample | x molar ratio | y molar ratio | z molar ratio | Sintering conditions Temp.×Time (°C) (hr) | Forming conditions | Q (at 8GHz) | $\varepsilon_r$ | $\tau_f$ (ppm/°C) | Note |
|---|---|---|---|---|---|---|---|---|---|---|
| 121 | ④ | 1.00 | 0.005 | SiO₂ 0.05 | 1500×4 | c | 10100 | 31 | +17.0 | |
| 122 | " | " | " | " 0.055 | " | " | 3100 | 29 | +31.0 | * |
| 123 | " | " | " | " 0.001 | 1150×4 | " | 390 | 33 | +45.0 | * |
| 124 | " | " | " | " | 1200×4 | " | 10000 | 31 | +20.0 | |
| 125 | " | " | " | " | 1400×4 | " | 11800 | 29 | +4.9 | |
| 126 | " | " | " | " | 1600×4 | " | 10600 | 29 | +7.1 | |
| 127 | " | " | " | " | 1650×4 | " | # | # | # | * |
| 128 | ③ | 1.00 | 0.005 | SiO₂ 0.001 | 1450×2 | " | 10600 | 29 | +3.1 | |
| 129 | " | " | " | " | 1450×16 | " | 11500 | 29 | +2.7 | |
| 130 | " | " | " | " | 1450×100 | " | 14200 | 30 | +2.5 | |

Note 1: In the column "Base sample", ③ and ④ refer to, respectively, the corresponding letters in Ba$_x$(M$_{1/3}$,Ta$_{2/3}$)O$_3$+zSiO$_2$/B$_2$O$_3$(wherein M represents Zn or Mg).

Note 2: x, y and z refer to, respectively, Ba$_x$(Zn$_{1/3}$,Ta$_{2/3}$)O$_3$ and Ba$_x$(Mg$_{1/3}$,Ta$_{2/3}$)O$_3$.

Note 3: In the column "Forming conditions", "c" means that the preparation of the raw materials has been conducted by using all the raw material powders.

Note 4: The symbol # means that the measurement has failed owing to the dissolution of the sample, or other reasons.

Note 5: The symbol * means that the samples have compositions outside the scope of the invention.

Figure 14

| Sample No. | Base sample | x molar ratio | y molar ratio (A1) | y molar ratio (A2) | z molar ratio (B1) | z molar ratio (B2) | Sintering conditions Temp.×Time (°C) (hr) | Forming conditions | Q (at 8GHz) | $\varepsilon_r$ | $\tau_f$ (ppm/°C) | Note |
|---|---|---|---|---|---|---|---|---|---|---|---|---|
| 131 | ③ | 1.00 | 0 | 0.35 | 0 | 0 | 1400×4 | e | 3000 | 35 | +21.0 | * |
| 132 | " | " | 0.001 | 0 | " | " | " | " | 11500 | 28 | +3.9 | |
| 133 | " | " | 0.005 | " | " | " | " | " | 11200 | 29 | +4.8 | |
| 134 | " | " | 0.01 | " | " | " | " | " | 10500 | 31 | +5.2 | |
| 135 | " | " | 0.1 | " | " | " | " | " | 10400 | 30 | +8.1 | |
| 136 | " | " | 0.3 | " | " | " | " | " | 10000 | 28 | +14.9 | |
| 137 | " | " | 0.35 | " | " | " | " | " | 2100 | 34 | +21.9 | * |
| 138 | " | " | 0.001 | 0.001 | " | " | " | " | 10700 | 29 | +5.2 | |
| 139 | " | " | 0.001 | 0.01 | " | " | " | " | 11200 | 30 | +11.1 | |
| 140 | " | " | 0.01 | 0.001 | " | " | " | " | 11000 | 30 | +10.9 | |

Note 1: In the column "Base sample", ③ refer to $Ba_x(Zn_{1/3},Ta_{2/3})O_3$.

Note 2: x, y and z refer to, respectively, the corresponding letters in $Ba_x(M_{1/3},Ta_{2/3})O_3+yMgTiO_3/SrTiO_3+zMnO/ZnO$ (wherein M represents Zn or Mg), while (A1), (A2), (B1) and (B2) refer to, respectively, $MgTiO_3$, $SrTiO_3$, MnO and ZnO.

Note 3: In the column "Forming conditions", "e" means that the preparation of the raw materials has been conducted by using all the raw material powders.

Note 4: The symbol * means that the samples have compositions outside the scope of the invention.

Figure 15

| Sample No. | Base sample | x molar ratio | y molar ratio (A1) | y molar ratio (A2) | z molar ratio (B1) | z molar ratio (B2) | Sintering conditions Temp.×Time (°C) (hr) | Forming conditions | Q (at 8GHz) | $\varepsilon_r$ | $\tau_f$ (ppm/°C) | Note |
|---|---|---|---|---|---|---|---|---|---|---|---|---|
| 141 | ③ | 1.00 | 0.01 | 0.01 | 0 | 0 | 1400×4 | e | 10800 | 30 | +12.5 | |
| 142 | 〃 | 〃 | 0.02 | 0.02 | 〃 | 〃 | 〃 | 〃 | 1200 | 33 | +25.0 | * |
| 143 | 〃 | 〃 | 0 | 0.001 | 0.001 | 〃 | 〃 | 〃 | 11000 | 29 | +6.1 | |
| 144 | 〃 | 〃 | 〃 | 〃 | 0.005 | 〃 | 〃 | 〃 | 12100 | 30 | +9.5 | |
| 145 | 〃 | 〃 | 〃 | 〃 | 0.01 | 〃 | 〃 | 〃 | 11700 | 30 | +10.1 | |
| 146 | 〃 | 〃 | 〃 | 〃 | 0.1 | 〃 | 〃 | 〃 | 11000 | 28 | +10.0 | |
| 147 | 〃 | 〃 | 〃 | 〃 | 0.3 | 〃 | 〃 | 〃 | 10000 | 28 | +9.5 | |
| 148 | 〃 | 〃 | 〃 | 〃 | 0.301 | 〃 | 〃 | 〃 | 5100 | 32 | +21.0 | * |
| 149 | 〃 | 〃 | 〃 | 〃 | 0 | 0.001 | 〃 | 〃 | 11100 | 30 | +7.0 | |
| 150 | 〃 | 〃 | 〃 | 〃 | 〃 | 0.005 | 〃 | 〃 | 11200 | 31 | +8.0 | |

Note 1: In the column "Base sample", ③ refer to $Ba_x(Zn_{1/3},Ta_{2/3})O_3$.

Note 2: x, y and z refer to, respectively, the corresponding letters in $Ba_x(M_{1/3},Ta_{2/3})O_3+yMgTiO_3/SrTiO_3+zMnO/ZnO$ (wherein M represents Zn or Mg), while (A1), (A2), (B1) and (B2) refer to, respectively, $MgTiO_3$, $SrTiO_3$, MnO and ZnO.

Note 3: In the column "Forming conditions", "e" means that the preparation of the raw materials has been conducted by using all the raw material powders.

Note 4: The symbol * means that the samples have compositions outside the scope of the invention.

Figure 16

| Sample No. | Base sample | x molar ratio | y molar ratio (A1) | y molar ratio (A2) | z molar ratio (B1) | z molar ratio (B2) | Sintering conditions Temp.×Time (°C) (hr) | Forming conditions | Q (at 8GHz) | ε_r | τ' (ppm/°C) | Note |
|---|---|---|---|---|---|---|---|---|---|---|---|---|
| 151 | ③ | 1.00 | 0 | 0.001 | 0 | 0.01 | 1400×4 | e | 11100 | 31 | +9.0 | |
| 152 | 〃 | 〃 | 〃 | 〃 | 〃 | 0.1 | 〃 | 〃 | 10200 | 30 | +12.0 | |
| 153 | 〃 | 〃 | 〃 | 〃 | 〃 | 0.3 | 〃 | 〃 | 10100 | 30 | +11.8 | |
| 154 | 〃 | 〃 | 〃 | 〃 | 〃 | 0.301 | 〃 | 〃 | 4000 | 31 | +25.0 | * |
| 155 | 〃 | 〃 | 〃 | 〃 | 0.001 | 0.001 | 〃 | 〃 | 11000 | 31 | +8.5 | |
| 156 | 〃 | 〃 | 〃 | 〃 | 0.01 | 0.001 | 〃 | 〃 | 10800 | 29 | +8.3 | |
| 157 | 〃 | 〃 | 〃 | 〃 | 0.15 | 0.17 | 〃 | 〃 | 2100 | 25 | +25.1 | * |
| 158 | 〃 | 〃 | 0.001 | 0.001 | 0.001 | 0.001 | 〃 | 〃 | 10900 | 30 | +10.5 | |
| 159 | 〃 | 〃 | 0.01 | 0.01 | 0.01 | 0.01 | 〃 | 〃 | 10000 | 35 | +12.5 | |
| 160 | 〃 | 〃 | 0.1 | 0.1 | 0.1 | 0.1 | 〃 | 〃 | 10000 | 36 | +15.8 | |

Note 1: In the column "Base sample", ③ refer to $Ba_x(Zn_{1/3},Ta_{2/3})O_3$.

Note 2: x, y and z refer to, respectively, the corresponding letters in $Ba_x(M_{1/3},Ta_{2/3})O_3 + yMgTiO_3/SrTiO_3 + zMnO/ZnO$ (wherein M represents Zn or Mg), while (A1), (A2), (B1) and (B2) refer to, respectively, $MgTiO_3$, $SrTiO_3$, MnO and ZnO.

Note 3: In the column "Forming conditions", "e" means that the preparation of the raw materials has been conducted by using all the raw material powders.

Note 4: The symbol * means that the samples have compositions outside the scope of the invention.

Figure 17

| Sample No. | Base sample | x molar ratio | y molar ratio (A1) | y molar ratio (A2) | z molar ratio (B1) | z molar ratio (B2) | Sintering conditions Temp.×Time (°C) (hr) | Forming conditions | Q (at 8GHz) | ε' | τ' (ppm/°C) | Note |
|---|---|---|---|---|---|---|---|---|---|---|---|---|
| 161 | ③ | 1.00 | 0 | 0.001 | 0 | 0 | 1250× 4 | e | 3800 | 26 | +10.0 | * |
| 162 | " | " | " | " | " | " | 1300× 4 | " | 10100 | 28 | +15.9 | |
| 163 | " | " | " | " | " | " | 1450× 4 | " | 11000 | 30 | +9.8 | |
| 164 | " | " | " | " | " | " | 1450× 50 | " | 12000 | 31 | +8.9 | |
| 165 | " | " | " | " | " | " | 1450×100 | " | 11900 | 31 | +8.6 | |
| 166 | " | " | " | " | " | " | 1550× 4 | " | 11000 | 31 | +9.0 | |
| 167 | " | " | " | " | " | " | 1600× 4 | " | 10800 | 30 | +8.5 | |
| 168 | " | " | " | " | " | " | 1650× 4 | f | # | # | # | * |
| 169 | " | " | " | " | " | " | 1400× 4 | " | 11500 | 29 | +5.3 | |
| 170 | " | " | " | " | 0.001 | " | " | " | 11300 | 29 | +6.3 | |

Note 1: In the column "Base sample", ③ refer to $Ba_x(Zn_{1/3},Ta_{2/3})O_3$.

Note 2: x, y and z refer to, respectively, the corresponding letters in $Ba_x(M_{1/3},Ta_{2/3})O_3+yMgTiO_3/SrTiO_3+zMnO/ZnO$ (wherein M represents Zn or Mg), while (A1), (A2), (B1) and (B2) refer to, respectively, $MgTiO_3$, $SrTiO_3$, MnO and ZnO.

Note 3: In the column "Forming conditions", "e" means that the preparation of the raw materials has been conducted by using all the raw material powders, and "f" means that $SrTiO_3$ has been mixed in the form of calcined powder.

Note 4: The symbol # means that the measurement has failed owing to the dissolution of the sample, or for other reasons.

Note 5: The symbol * means that the samples have compositions outside the scope of the invention.

Figure 18

| Sample No. | Base sample | x molar ratio | y molar ratio (A1) | y molar ratio (A2) | z molar ratio (B1) | z molar ratio (B2) | Sintering conditions Temp.×Time (°C) (hr) | Forming conditions | Q (at 8GHz) | $\varepsilon_r$ | $\tau_r$ (ppm/°C) | Note |
|---|---|---|---|---|---|---|---|---|---|---|---|---|
| 171 | ③ | 1.00 | 0 | 0.001 | 0.01 | 0 | 1400× 4 | f | 11900 | 30 | +9.8 | |
| 172 | " | " | " | " | 0.1 | " | " | " | 11000 | 28 | +10.0 | |
| 173 | " | " | " | " | 0.301 | " | " | " | 4300 | 33 | +22.0 | * |
| 174 | ④ | 0.85 | " | " | 0.001 | " | 1350× 4 | " | 2100 | 25 | +15.0 | * |
| 175 | " | 0.90 | " | " | " | " | " | " | 10000 | 28 | +11.0 | |
| 176 | " | 1.00 | " | " | " | " | " | " | 11000 | 29 | +9.5 | |
| 177 | " | 1.10 | " | " | " | " | " | " | 11100 | 29 | −7.0 | |
| 178 | " | 1.15 | " | " | " | " | " | " | 1000 | 35 | −2.1 | * |
| 179 | " | 1.00 | " | " | " | " | 1250× 4 | " | 1100 | 22 | +12.0 | * |
| 180 | " | " | " | " | " | " | 1650× 4 | " | # | # | # | * |

Note 1: In the column "Base sample", ③ and ④ refer to, respectively, $Ba_x(Zn_{1/3}Ta_{2/3})O_3$ and $Ba_x(Mg_{1/3}Ta_{2/3})O_3$.

Note 2: x, y and z refer to, respectively, the corresponding letters in $Ba_x(M_{1/3}Ta_{2/3})O_3 + yMgTiO_3/SrTiO_3 + zMnO/ZnO$ (wherein M represents Zn or Mg), while (A1), (A2), (B1) and (B2) refer to, respectively, $MgTiO_3$, $SrTiO_3$, MnO and ZnO.

Note 3: In the column "Forming conditions", "f" means that $SrTiO_3$ has been mixed in the form of calcined powder.

Note 4: The symbol # means that the measurement has failed owing to the dissolution of the sample, or for other reasons.

Note 5: The symbol * means that the samples have compositions outside the scope of the invention.

CERAMIC DIELECTRICS AND METHODS FOR FORMING THEM

FIELD OF THE INVENTION

The present invention concerns ceramic dielectrics for use in electronic components and, in particular, it relates to ceramic dielectrics having a large unloaded Q-value and high relative dielectric constant, and a small temperature coefficient of resonant frequency, as well as methods for forming them.

RELATED ART STATEMENT

Heretofore, ceramic dielectrics for high frequency have often been used as materials for antenna duplexers for radio communication equipment such as mobile phones, cellular phones and chordless telephones, resonators used, for example, in voltage-controlled oscillators, or filters used in tuners for CATV. Since the wavelength of electromagnetic waves can be shortened in ceramic dielectrics for high frequency, to $\epsilon_r^{-1/2}$ ($\epsilon_r$: relative dielectric constant) of the wavelength in a vacuum, electronic components such as resonators can be miniaturized by using such ceramic dielectrics.

The following three characteristics are required for such ceramic dielectrics for high frequency.

(a) A relative dielectric constant is as high as possible. That is, since the wavelength of high frequency is shortened to $\epsilon_r^{-1/2}$ ($\epsilon_r$: relative dielectric constant) in the dielectrics, the size of the resonators, etc. can be miniaturized more easily as the relative dielectric constant increases for an identical resonant frequency.

(b) Dielectric loss (1/Q) is small in a high frequencies. That is, the unloaded Q-value is large.

(c) The variation coefficient of resonant frequency is only slightly affected by temperature change. That is, the temperature dependence on the relative dielectric constant is small.

The ceramic dielectrics used until now, for example, in microwave dielectric resonators, have various kinds of compositions. They have been known to include $BaO$-$TiO_2$-base and $ZrTiO_4$-base ceramics. As ceramic dielectrics related to the present invention, $Ba(Zn_{1/3}, Ta_{2/3})O_3$-base and $Ba(Mg_{1/3}, Ta_{2/3})O_3$-base ceramics have been known. For instance, Japanese Patent Publication No. 59-48484 describe ceramics of a particularly high unloaded Q-value having ingredients $BaO$, $ZnO$ and $Ta_2O_5$. Furthermore, it has been reported that addition of a small amount of $SiO_2$ to $Ba(Zn_{1/3}, Ta_{2/3})O_3$-$Ba(Zn_{1/3}, Nb_{2/3})O_3$-base ceramics is effective in facilitating sintering and enhancing the Q-value (refer to "Material", Vol. 43 (1994), No. 489, 629–634 pp).

For the ceramic dielectrics, it is required that the relative dielectric constant ($\epsilon_r$) and the unloaded Q-value are large and the temperature coefficient of resonant frequency ($\tau_f$) is nearly equal to zero. However, no ceramic dielectric capable of satisfying all of the characteristics has as yet been developed. Also, in the $Ba(Zn_{1/3}, Ta_{2/3})O_3$-base or $Ba(Mg_{1/3}, Ta_{2/3})O_3$-base ceramics, miniaturizing of components is difficult since the relative dielectric constant ($\epsilon_r$) is as low as 27 or less yet the Q-value is large. Furthermore, a satisfactory sintering is obtained by a process, which is strictly controlled and follows certain conditions, for example, sintering a specimen while placing it on a platinum plate in a magnesia crucible. Other ceramics are also having problems involving poor sintererability at high temperatures. Stable characteristics can not be easily achieved due to the varying conditions of the sintering.

The present invention has been accomplished for overcoming the foregoing problems and providing easy sinterable ceramic dielectrics, capable of satisfying all the characteristics required for ceramic dielectrics for high frequency, as well as, methods of forming them. A specific object of the present invention is to provide ceramic dielectrics that have a high Q-value, relative dielectric constant ($\epsilon_r$) as high as 25 or more which is not attainable in existent materials containing a high Q-value and a temperature coefficient of resonant frequency ($\tau_f$) of +20 to −10 ppm/°C, and a sintering temperature of 1650° C. or less, which is lower than the existent sintering temperature range, and capable of providing stable dielectric characteristics, as well as methods of forming them.

DISCLOSURE OF THE INVENTION

The present inventors, et al have made studies for overcoming the foregoing problems and reached the following conclusions.

①The addition of a predetermined amount of $CaTiO_3$ to $Ba(Zn_{1/3}, Ta_{2/3})O_3$-base or $Ba(Mg_{1/3}, Ta_{2/3})O_3$-base ceramics can provide ceramic dielectrics having a higher unloaded Q-value (Q-value of 10,000 or more at 8 GHz) and a higher relative dielectric constant ($\epsilon_r$ of 25 or more) than usual, capable of controlling the temperature coefficient of resonant frequency ($\tau_f$) to a small value ($\tau_f$ of +20 to −10 ppm/°C.) and having a lower sintering temperature (1300°–1650° C.) than usual.

②The addition of a predetermined amount of $CaTiO_3$ and one or both of $SiO_2$ and $B_2O_3$ as additives to $Ba(Zn_{1/3}, Ta_{2/3})O_3$-base or $Ba(Mg_{1/3}, Ta_{2/3})O_3$-base ceramics can provide ceramic dielectrics having a further lower sintering temperature (1200°–1600° C.), a higher unloaded Q-value (Q-value of 10,000 or more at 8 GHz) and a higher relative dielectric constant ($\epsilon_r$ of 28 or more) than usual, and a small temperature coefficient of resonant frequency ($\tau_f$ of +20 to −10 ppm/°C.).

③The addition of one or both of $MgTiO_3$ and $SrTiO_3$ to $Ba(Zn_{1/3}, Ta_{2/3})O_3$-base or $Ba(Mg_{1/3}, Ta_{2/3})O_3$-base ceramics can provide ceramic dielectrics having a higher unloaded Q-value (Q-value of 10,000 or more at 8 GHz) and a higher relative dielectric constant ($\epsilon_r$ of 28 or more) than usual, and a small temperature coefficient of resonant frequency ($\tau_f$ of +20 to −10 ppm/°C.) and also having a lower sintering temperature (1300° to 1600° C.).

④The addition of $MnO$ and/or $ZnO$ as additives to the above ceramic dielectrics ① and ③ can bring about uniform sintering.

The present invention has been accomplished in accordance with the conclusions described above, and the feature of the invention resides in the ceramic dielectrics and the methods of forming them as defined in clauses (1) to (9) that follow.

(1) A ceramic dielectric consisting essentially of a composition represented by: $Ba(M_{1/3}, Ta_{2/3})O_3+yCaTiO_3+zMnO/ZnO$ (in which M is Zn or Mg, MnO/ZnO means MnO and/or ZnO), wherein y and z each has a value satisfying the respective equations:

$$0<y\leq0.3$$

$$0<z\leq0.05.$$

(2) A method of forming the ceramic dielectric defined above in (1), which comprises the steps of adding one or more powders selected from compounds containing Mn and/or Zn as additives to a mixture of compounds containing Ba, Zn or Mg, Ta, Ca and Ti respectively as a raw material powder, mixing and pressing the powders such that, after sintering, they provide a composition represented by: Ba($M_{1/3}$, $Ta_{2/3}$)$O_3$+yCaTiO$_3$+zMnO/ZnO (in which M is Zn or Mg, MnO/ZnO means MnO and/or ZnO, y and z each respectively represents a value within a range: (0<y≦0.3, 0<z≦0.005) and then sintering them in the air or an oxygen atmosphere at a temperature of 1300° to 1650° C.

(3) A method of forming the ceramic dielectric defined above in (1), which comprises the steps of mixing a calcined powder of a mixture of compounds containing Ba, Zn or Mg and Ta respectively and a calcined powder of a mixture of compounds containing Ca and Ti respectively, subsequently adding one or more powders selected from compounds containing Mn and/or Zn as additives to the mixed calcined powder, mixing and pressing the powders such that, after sintering, they provide a composition represented by: Ba($M_{1/3}$, $Ta_{2/3}$)$O_3$+yCaTiO$_3$+zMnO/ZnO (in which M is Zn or Mg, MnO/ZnO means MnO and/or ZnO, y and z each respectively represents a value within a range: 0<y≦0.3, 0<z≦0.05) and then sintering them in the air or an oxygen atmosphere at a temperature of 1300° to 1650° C.

(4) A ceramic dielectric consisting essentially of a composition represented by: Ba$_x$($M_{1/3}$, $Ta_{2/3}$)$O_3$+yCaTiO$_3$+zSiO$_2$/B$_2$O$_3$ (in which M is Zn or Mg, SiO$_2$/B$_2$O$_3$ means SiO$_2$ and/or B$_2$O$_3$), wherein x, y and z each has a value satisfying the respective equations:

$0.9 \leq x \leq 1.1$ $0 < y \leq 0.3$ $0 < z \leq 0.05$.

(5) A method of forming the ceramic dielectric defined above in (4), which comprises the steps of adding one or more powders selected from compounds containing Si and/or B as additives to a mixture of compounds containing Ba, Zn or Mg, Ta, Ca and Ti respectively as a raw material powder, mixing and pressing the powders such that, after sintering, they provide a composition represented by: Ba$_x$($M_{1/3}$, $Ta_{2/3}$)$O_3$+yCaTiO$_3$+zSiO$_2$/B$_2$O$_3$ (in which M is Zn or Mg, SiO$_2$/B$_2$O$_3$ means SiO$_2$ and/or B$_2$O$_3$.x, y and z each respectively represents a value within a range: $0.9 \leq X \leq 1.1$, 0<y≦0.3, 0<z≦0.05) and then sintering them in the air or an oxygen atmosphere at a temperature of 1200° to 1600° C.

(6) A method of forming the ceramic dielectric defined above in (4), which comprises the steps of mixing a calcined powder of a mixture of compounds containing Ba, Zn or Mg and Ta respectively and a calcined powder of a mixture of compounds containing Ca and Ti respectively, subsequently adding one or more powders selected from compounds containing Si and/or B as additives to the mixed calcined powder, mixing and pressing the powders such that, after sintering, they provide a composition represented by: Ba$_x$($M_{1/3}$, $Ta_{2/3}$)$O_3$+yCaTiO$_3$+zSiO$_2$/B$_2$O$_3$ (in which M is Zn or Mg, SiO$_2$/B$_2$O$_3$ means SiO$_2$ and/or B$_2$O$_3$. x, y and z each respectively represents a value within a range: $0.9 \leq x \leq 1.1$, 0<y≦0.3, 0<z≦0.05) and then sintering them in the air or an oxygen atmosphere at a temperature of 1200° to 1600° C.

(7) A ceramic dielectric consisting essentially of a composition represented by: Ba$_x$($M_{1/3}$, $Ta_{2/3}$)$O_3$+yMgTiO$_3$/SrTiO$_3$+zMnO/ZnO (in which M is Zn or Mg, MgTiO$_3$/SrTiO$_3$ means MgTiO$_3$ and/or SrTiO$_3$, MnO/ZnO means MnO and/or ZnO), wherein x, y and z each has a value satisfying the respective equations:

$0.9 \leq x \leq 1.1$ $0 < y \leq 0.3$ $0 \leq z \leq 0.05$.

(8) A method of forming the ceramic dielectric defined above in (7), which comprises the steps of adding one or more powders selected from compounds containing Mn and/or Zn as additives to a mixture of compounds containing Ba, Zn or Mg, Ta, Mg and/or Sr and Ti respectively as a raw material powder, mixing and pressing the powders such that, after sintering, they provide a composition represented by: Ba$_x$($M_{1/3}$, $Ta_{2/3}$)$O_3$+yMgTiO$_3$/SrTiO$_3$+zMnO/ZnO (in which M is Zn or Mg, MgTiO$_3$/SrTiO$_3$ means MgTiO$_3$ and/or SrTiO$_3$, MnO/ZnO means MnO and/or ZnO, x, y and z each respectively represents a value within a range: $0.9 \leq x \leq 1.1$, 0<y≦0.3, 0≦z≦0.05) and then sintering them in the air or an oxygen atmosphere at a temperature of 1300° to 1600° C. z described above indicates that a case of 0 (zero), that is, in the case of not adding the additives, may also be included. This is also applicable to the subsequent clause (9).

(9) A method of forming the ceramic dielectric defined above in (7), which comprises the steps of mixing a calcined powder of a mixture of compounds containing Ba, Zn or Mg and Ta respectively and a calcined powder of a mixture of compounds containing Mg and/or Sr, and Ti respectively, subsequently adding one or more powders selected from compounds containing Mn and/or Zn as additives to the mixed calcined powder, mixing and pressing the powders such that, after sintering, they provide a composition represented by: Ba$_x$($M_{1/3}$, $Ta_{2/3}$)$O_3$+yMgTiO$_3$/SrTiO$_3$+zMnO/ZnO (in which M is Zn or Mg, MgTiO$_3$/SrTiO$_3$ means MgTiO$_3$ and/or SrTiO$_3$, MnO/ZnO means MnO and/or ZnO, x, y and z each respectively represents a value within a range: $0.9 \leq x \leq 1.1$, 0<y≦0.3, 0≦z≦0.05) then sintering them in the air or an oxygen atmosphere at a temperature of 1300° to 1600° C.

BRIEF DESCRIPTION OF THE DRAWINGS

FIG. 1 to FIG. 5 are illustrating the results of the measurements for a ceramic dielectric represented by: Ba($M_{1/3}$, $Ta_{2/3}$)$O_3$+yCaTiO$_3$+zMnO/ZnO (in which M is Zn or Mg), regarding the values for y and z, the sintering temperature, forming conditions and electric characteristics (unloaded Q-value, relative dielectric constant $\epsilon_r$ and temperature coefficient of resonant frequency $\tau_f$).

FIG. 6 is a schematic view for the main portion of an apparatus used for the measurement of ceramic dielectrics for an unloaded Q-value, relative dielectric constant ($\epsilon_r$) and temperature coefficient of resonant frequency ($\tau_f$) in which (a) is a plan view and (b) is a front profile view.

FIG. 7 to FIG. 13 are illustrating the results of the measurements for a ceramic dielectric represented by: Ba$_x$($M_{1/3}$, $Ta_{2/3}$)$O_3$+zSiO$_2$/B$_2$O$_3$ (in which M is Zn or Mg), regarding the values for x, y and z, the sintering temperature, forming conditions and electric characteristics (unloaded Q-value, relative dielectric constant $\epsilon_r$ and temperature coefficient of resonant frequency $\tau_f$).

FIG. 14 to FIG. 18 are illustrating the results of the measurements for a ceramic dielectric represented by: Ba$_x$($M_{1/3}$, $Ta_{2/3}$)$O_3$+yMgTiO$_3$/SrTiO$_3$+zMgO/ZnO (in which M is Zn or Mg), regarding the values for x, y and z, the sintering temperature, forming conditions and electric characteristics (unloaded Q-value, relative dielectric constant $\epsilon_r$ and temperature coefficient of resonant frequency $\tau_f$).

BEST MODE FOR PRACTICING THE INVENTION

The reasons for defining the ceramic dielectrics and the methods of forming them in the present invention will be specifically explained.

The ceramic dielectric of the present invention (invention (1) described above) is a composition represented by: $Ba(M_{1/3}, Ta_{2/3})O_3+yCaTiO_3+zMnO/ZnO$ (in which M is Zn or Mg, y is greater than 0 and 0.3 or less, and z is greater than 0 and 0.05 or less).

If y is 0 (zero), that is, $CaTiO_3$ is not included, then the sintering temperature is high, the relative dielectric constant ($\epsilon_r$) is lower than 25, and the dielectric characteristics such as the Q-value are not stable. On the other hand, if y exceeds 0.3, that is, if the molar ratio of $CaTiO_3$ to $Ba(M_{1/3}, Ta_{2/3})$ exceeds 0.3 mol, then the Q-value at 8 GHz is smaller than 10,000, thus failing to obtain ceramic dielectrics which have predetermined characteristics. Accordingly, the range for y is defined as:

$$0<y\leq 0.3.$$

The range for z is: $0<z\leq 0.05$, that is, the molar ratio to $Ba(M_{1/3}, Ta_{2/3})O_3$ is 0.05 or less (excluding 0). If MnO and/or ZnO is included, uniform sintering is brought about. However, if z is greater than 0.05, then the Q-value at 8 GHz is less than 10,000 and the temperature coefficient of resonant frequency ($\tau_f$) is out of the range of +20 to −10 ppm/°C., both of which are out of the required range for the present invention.

The ceramic dielectric, according to the present invention described above, has a high Q-value (10,000 or more at 8 GHz) and has a high value of 25 or more for the relative dielectric constant ($\epsilon_r$) which is not found in existent materials of particularly high Q-value, and the temperature coefficient of resonant frequency ($\tau_f$) also shows a value within a range of +20 to −10 ppm/°C.

In the above inventions (2) and (3) the methods are provided for forming the ceramic dielectric of the invention (1) described above. Invention (2) will be explained in the order in which the steps cause the forming process.

①The powders of $BaCO_3$, ZnO or MgO, $Ta_2O_5$, $CaCO_3$ and $TiO_2$ are the raw materials for the synthesis of ceramics, and $MnCO_3$ and/or ZnO are additives, all powders are accurately weighed so as to provide a composition as defined above in (2), and mixed in a pot mill together with the appropriate amount of balls, dispersant and water. Preferably mixing is conducted for about 24 hours.

②The mixed raw materials in a slurry were dewatered, dried and crushed. The crushed powder is transferred, as in the example, to a zirconia crucible for sintering, and calcined and synthesized at 1,000° C. in the air atmosphere. In this stage, it is desirable to confirm that a predetermined solid solution is synthesized, as in the example, by X-ray analysis.

③The calcined and synthesized powder is crushed and granulated to a powder having an almost uniform grain size of about 1.0 μ/m.

④Then, an organic binder or such like is added to the granules and pressed, as in the example, into a cylindrical shape having a 10 mm diameter and a 5 mm height.

⑤The pressed specimen is heated at 600° C. for binder burnout.

⑥After binder burnout, they were arranged for sintering on a plate made of magnesia and sintered in a temperature range of 1300° to 1650° C. Sintering may be applied by the usual methods in the air or an oxygen atmosphere.

If the sintering temperature is lower than 1300° C., no dense sintered product is obtained and the Q-value at 8 GHz will decrease to 5,000 or less. On the other hand, if the sintering temperature is higher than 1650° C., the sintered specimen looses its shape, making it impossible for measurement of the Q-value.

⑦The resultant sintered specimen (ceramics) is polished such that the upper surface and the lower surface are parallel with each other and the resonant frequency is 8 GHz and then the specimen is washed thoroughly in water.

The invention (3) described above is a method of calcining $BaCO_3$, ZnO or MgO and $Ta_2O_5$ and calcining $CaCO_3$ and $TiO_2$ separately, then mixing them so as to provide a predetermined composition as defined above in (3), further adding $MnCO_3$ and/or ZnO as additives and then applying the procedures at and after ③ described above, to obtain a sintered specimen (ceramics).

In the above inventions (2) and (3), any of the compounds such as oxalates and nitrates may be used as the raw material, not restricted only to the oxides or carbonates described above, so long as the required ceramic dielectric can be obtained after sintering.

According to the present inventions described above (inventions (2) and (3)), a ceramic dielectric as described in (1) having a higher unloaded Q-value and a higher relative dielectric constant than usual and showing a smaller value for the temperature coefficient of resonant frequency ($\tau_f$) can be formed easily at a lower sintering temperature (1300°–1650° C.) than usual.

The invention (4) provides a ceramic dielectric represented by: $Ba_x(M_{1/3}, Ta_{2/3})O_3+yCaTiO_3+zSiO_2/B_2O_3$ (in which M is Zn or Mg, $SiO_2/B_2O_3$ means $SiO_2$ and/or $B_2O_3$, y is greater than 0 and 0.3 or less and z is greater than 0 and 0.05 or less), by making the range of $Ba/(M_{1/3}, Ta_{2/3})$ ratio to wider than 1 (0.9–1.1) and adding $CaTiO_3$ and, further, $SiO_2$ and/or $B_2O_3$ as the additives for enhancing the sinterability in an existent ceramics of $Ba(M_{1/3}, Ta_{2/3})O_3$.

$Ba/(M_{1/3}, Ta_{2/3})$ ratio, that is, x in the composition above, is defined as: $0.9\leq x\leq 1.1$, because a high Q-value can be maintained if x is within the required range, and the Q-value at 8 GHz is decreased as low as 5,000 or less if x is out of the required range.

Furthermore, the range for y is: $0<y\leq 0.3$, that is, the molar ratio of $CaTiO_3$ to $Ba_x(M_{1/3}, Ti_{2/3})O_3$ is 0.3 mol or less (excluding 0). If y is 0 (zero), that is, if $CaTiO_3$ is not included, then the sintering temperature is high, thus the relative dielectric constant ($\epsilon_r$) is less than 28, and dielectric characteristics such as the Q-value are not stable. On the other hand, if y exceeds 0.3, then the Q-value at 8 GHz is less than 10,000, thus failing to obtain a ceramic dielectric having predetermined characteristics.

The range for z is: $0<z\leq 0.05$, that is, the molar ratio of $SiO_2$ and/or $B_2O_3$ to $Ba_x(M_{1/3}, Ta_{2/3})O_3$ is 0.05 mol or less (excluding 0). If z is 0, the relative dielectric constant ($\epsilon_r$) is lower than 28 and, in particular, if the sintering temperature is 1400° C. or less, the Q-value and the relative dielectric constant ($\epsilon_r$) are not stable. On the other hand, if z exceeds 0.05, the Q-value at 8 GHz is lower than 10,000 and the temperature coefficient of resonant frequency ($\tau_f$) is out of the range of +20 to −10 ppm/°C.

The ceramic dielectric, according to the present invention described above, has a higher Q-value (10,000 or more at 8 GHz) than usual, and has a high value of 28 or more for the relative dielectric constant ($\epsilon_r$) which until now has not been attained, particularly in a material of a higher Q-value, and the temperature coefficient of resonant frequency($\tau_f$) also shows a value within a range of +20 to −10 ppm/°C.

In the above inventions (5) and (6) the methods are provided for forming the ceramic dielectric of the invention (4) described above.

Invention(5) is identical to invention (2) except for the preparation of the raw materials and the sintering condition, only the differences are explained below. Reference numbers, ①–⑦ are attached to the heads of the respective steps corresponding to the reference numbers, ①–⑦ used in the explanation for invention (2).

① The powders of $BaCO_3$, ZnO or MgO, $Ta_2O_5$, $CaCO_3$ and $TiO_2$ are the raw materials, and $SiO_2$ and/or $B_2O_3$ are additives, all powders are accurately weighed so as to provide a composition as defined above in (5), and mixed in a pot mill together with the appropriate amount of balls, dispersant and water. Preferably mixing is conducted for about 24 hours.

②–⑤: Identical with those in invention (2) as described above.

⑥ After binder burnout, they are arranged, as in the example, on a plate for sintering made of magnesia and sintered in a temperature range of 1200° to 1600° C. Sintering may be applied by the usual methods in the air or an oxygen atmosphere.

If the sintering temperature is lower than 1200° C., no dense sintered product is obtained, and the Q-value at 8 GHz will decrease to 5,000 or less. On the other hand, if the sintering temperature is higher than 1600° C., the sintered specimen loses its shape, making it impossible for measurement of the Q-value.

⑦ The resultant sintered specimen (ceramics) is polished such that the upper surface and the lower surface are parallel with each other and the resonant frequency is 8 GHz and then the specimen is washed thoroughly in water.

The invention (6) is a method of calcining $BaCO_3$, ZnO or MgO and $Ta_2O_5$ and calcining $CaCO_3$ and $TiO_2$ separately, then mixing them so as to provide a predetermined composition as defined above in (6), then further adding $SiO_2$ and/or $B_2O_3$ as additives and then applying the procedures at and after ③ described above, to obtain a sintered specimen (ceramics).

In the inventions (5) and (6), any of the compounds such as oxalates and nitrates may be used as the raw material, not restricted to the oxides or carbonates described above, so long as the required ceramic dielectric can be obtained after sintering.

According to the present inventions described above (inventions (5) and (6)), the sintering temperature can be lowered further (1200°~1600° C.) and it is possible to easily form a ceramic dielectric as described above in (4) having a higher unloaded Q-value and a higher relative dielectric constant than usual, and showing a smaller value for the temperature coefficient of resonant frequency($\tau_f$).

The invention (7) provides a ceramic dielectric represented by: $Ba_x(M_{1/3}, Ta_{2/3})O_3+yMgTiO_3/SrTiO_3+zMnO/ZnO$ (in which M is Zn or Mg, y is greater than 0 and 0.3 or less, and z is of 0 to 0.05), by making the range of $Ba/(M_{1/3}, Ta_{2/3})$ ratio to wider than 1 (0.9~1.1) and adding $MgTiO_3$ and/or $SrTiO_3$ for enhancing the relative dielectric constant ($\epsilon_r$) in the existent ceramics of $Ba(M_{1/3}, Ta_{2/3})O_3$.

$Ba/(M_{1/3}, Ta_{2/3})$ ratio, that is, x in the composition above is defined as $0.9 \leq x \leq 1.1$, because a high Q-value can be maintained if the x is within the required range, and the Q-value at 8 GHz is decreased as low as 5,000 or less if x is out of the required range.

Furthermore, the range for y is: $0<y\leq 0.3$, that is, the molar ratio of $MgTiO_3$ and/or $SrTiO_3$ to $Ba_x(M_{1/3}, Ti_{2/3})O_3$ is 0.3 mol or less (excluding 0). If y is 0 (zero), that is, if none of $MgTiO_3$ and $SrTiO_3$ is included, then the sintering temperature is high, thus the relative dielectric constant ($\epsilon_r$) is less than 28. On the other hand, if y exceeds 0.3, then the Q-value at 8 GHz is less than 10,000, thus failing to obtain a ceramic dielectric having predetermined characteristics. Additional $MgTiO_3$ and/or $SrTiO_3$ can also bring about the effect of controlling the temperature coefficient of resonant frequency ($\tau_f$) to a value within a range of +20 to −10 ppm/°C.

z may be 0 (zero). However, if MnO and/or ZnO are included within such a range that z does not exceed 0.05, uniform sintering can be obtained. On the other hand, if z exceeds 0.05, then the Q-value at 8 GHz is lower than 10,000 and the temperature coefficient of resonant frequency ($\tau_f$) is out of the range of +20 to −10 ppm/°C.

The ceramic dielectric, according to the present invention described above, has a higher Q-value (10,000 or more at 8 GHz) than usual, and has a high value of 28 or more for the relative dielectric constant ($\epsilon_r$) which until now has not been attained, particularly in a material of a higher Q-value, and the temperature coefficient of resonant frequency ($\tau_f$) also shows a value within a range of +20 to −10 ppm/°C.

In the above inventions (8) and (9) the methods are provided for forming the ceramic dielectric of the present invention (7) described above.

Invention (8) is identical to invention (2) except for the preparation of the raw materials and the sintering condition, only the differences are explained below. Reference numbers, ①–⑦ are attached to the heads of the respective steps corresponding to the reference numbers, ①–⑦ used in the explanation for invention (2).

① The powders of $BaCO_3$, ZnO or MgO, $Ta_2O_5$, $MgCO_3$ and/or $SrCO_3$ and $TiO_2$ are the raw materials, and MnO and/or ZnO are additives, all powders are accurately weighed so as to provide a composition as defined above in (8), and mixed in a pot mill together with the appropriate amount of balls, dispersant and water. Preferably mixing is conducted for about 24 hours. MnO and/or ZnO as the additives may not necessarily be added.

②–⑤: Identical with those in the invention (2) as described above.

⑥ After binder burnout, they are arranged, as in the example, on a plate for sintering made of magnesia and sintered in a temperature range of 1300° to 1600° C. Sintering may be applied by the usual methods in the air or an oxygen atmosphere.

If the sintering temperature is lower than 1300° C., no dense sintered product is obtained, and the Q-value at 8 GHz will decrease to 5,000 or less. On the other hand, if the sintering temperature is higher than 1600° C., the sintered specimen loses its shape, making it impossible to measure the Q-value.

⑦ The resultant sintered specimen (ceramics) is polished such that the upper surface and the lower surface are parallel with each other and the resonant frequency is 8 GHz and then the specimen is washed thoroughly in water.

The invention (9) is a method of calcining $BaCO_3$, ZnO or MgO and $Ta_2O_5$ and calcining $MgCO_3$ and/or $SrCO_3$ and $TiO_2$ separately, then mixing them so as to provide a predetermined composition as defined in (9), then further adding MnO and/or ZnO as additives and then applying the procedures at and after ③ described above, to obtain a sintered specimen (ceramics). Also in this case, MnO and/or ZnO as additives may not necessarily be added.

In the inventions (8) and (9), any of the compounds such as oxalates and nitrates may be used as the raw material, not restricted to the oxides or carbonates described above, so long as the required ceramic dielectric can be obtained after sintering.

According to the present inventions (inventions (8) and (9)), it is possible to easily form a ceramic dielectric as described above in (7) having a higher unloaded Q-value and a higher relative dielectric constant, and showing a smaller value for the temperature coefficient of resonant frequency ($\tau_f$), at a lower sintering temperature (1300°–1600° C.) than usual.

(EXAMPLE 1)

By applying the methods of the present inventions (inventions (2) and (3)), ceramic dielectrics represented by: Ba(Zn$_{1/3}$, Ta$_{2/3}$)O$_3$+yCaTiO$_3$+zMnO/ZnO, and Ba(Mg$_{1/3}$, Ta$_{2/3}$)O$_3$+y CaTiO$_3$+zMnO/ZnO were formed and their electric characteristics (unloaded Q-value, relative dielectric constant $\epsilon_r$ and temperature coefficient of resonant frequency $\tau_f$) were measured. As a comparison to the present inventions, alternative methods for obtaining ceramic dielectrics were conducted and measured by observing electric characteristics (unloaded Q-value, relative dielectric constant $\epsilon_r$ and temperature coefficient of resonant frequency $\tau_f$).

FIG. 1 to FIG. 5 show the values for y and z of the compositions, the sintering temperature (the sintering time was 4 hours in each case), and the forming conditions. In the base sample column, ① represents Ba(Zn$_{1/3}$, Ta$_{2/3}$)O$_3$ and ② represents Ba(Mg$_{1/3}$, Ta$_{2/3}$)O$_3$. Furthermore, a in the forming conditions column represents that preparation of the raw materials for obtaining the predetermined composition, was conducted by using all the raw material powders and which were then calcined, granulated, pressed and sintered, while b demonstrates that the preparation of the raw materials was conducted by mixing the calcined powder of CaTiO$_3$ to the calcined powder of Ba(Zn$_{1/3}$, Ta$_{2/3}$)O$_3$ or Ba(Mg$_{1/3}$, Ta$_{2/3}$)O$_3$ which in turn were granulated, pressed and sintered. Hence, a corresponds to invention (2), while b corresponds to invention (3).

The Q-value, the relative dielectric constant ($\epsilon_r$) and the temperature coefficient of resonant frequency ($\tau_f$) were measured by the post-resonance technique (Hakki-Coleman dielectric resonator method) proposed by Hakki-Coleman.

FIG. 6 is a schematic view for a main portion of an apparatus used for the measurement, in which (a) is a plan view and (b) is a front profile view (enlarged). In the figure, a ceramic dielectric (specimen) shown as 1 was used as an object for measurement and was put between two parallel metal plates shown as 2. The unloaded Q-value was determined by previously measuring the dielectric loss of the metal plate 2 due to the surface resistivity of the metal plate that had been previously measured using a standard specimen, then subtracting the value from the measured value of the dielectric loss using the original specimen. Furthermore, the relative dielectric constant ($\epsilon_r$) was determined by generating electromagnetic waves in high frequency from one of the probes as shown as 4 of a network analyzer to measure the frequency characteristic of the specimen and calculated by the result of resonant frequency peak in TEO1 δ mode and the size of the specimen. It was satisfactorily determined if the Q-value at 8 GHz was 10,000 or more and the relative dielectric constant ($\epsilon_r$) was 25 or more, then the specimen was acceptable.

The temperature coefficient of resonant frequency ($\tau_f$) was determined by measuring the resonant frequency while varying the temperature of the measuring atmosphere of –30° C. to +85° C. The temperature coefficient of resonant frequency ($\tau_f$) was satisfactorily determined if it was within a range of +20 to –10 ppm/°C., then the specimen was acceptable.

The results of the measurements are collectively shown in FIG. 1 to FIG. 5. The values shown in FIG. 1 to FIG. 5 illustrate an average taken for 50 specimens in each sample number. In the ceramic dielectrics obtained by applying the method used in the present invention, it was then observed that the unloaded Q-value was high, the relative dielectric constant ($\epsilon_r$) had a high value of 25 or more, and the temperature coefficient of resonant frequency ($\tau_f$) was also within a range of +20 to –10 ppm/°C., all of which were satisfactory.

(EXAMPLE 2)

By applying the methods of the present inventions (inventions (5) and (6)), ceramic dielectrics represented by: Ba$_x$(Zn$_{1/3}$, Ta$_{2/3}$)O$_3$+yCaTiO$_3$+zSiO$_2$/B$_2$O$_3$, and Ba$_x$(Mg$_{1/3}$, Ta$_{2/3}$)O$_3$+yCaTiO$_3$+zSiO$_2$/B$_2$O$_3$ were formed and their electric characteristics (unloaded Q-value, relative dielectric constant $\epsilon_r$ and temperature coefficient of resonant frequency $\tau_f$) were measured. As a comparison to the present inventions, alternative methods for obtaining ceramic dielectrics were conducted and measured by observing electric characteristics (unloaded Q-value, relative dielectric constant $\epsilon_r$ and temperature coefficient of resonant frequency $\tau_f$).

FIG. 7 to FIG. 13 show the values for x, y and z of the compositions, the sintering conditions and the forming conditions. In the base sample column, ③ represents Ba$_x$(Zn$_{1/3}$, Ta$_{2/3}$)O$_3$ and ④ represents Ba$_x$(Mg$_{1/3}$, Ta$_{2/3}$)O$_3$. Furthermore, c in the forming conditions column represents that preparation of the raw materials for obtaining the predetermined composition, was conducted by using all the raw material powders and which were then calcined, granulated, pressed and sintered, while d demonstrates that the preparation of the raw materials was conducted by mixing the calcined powder of CaTiO$_3$ to the calcined powder of Ba$_x$(Zn$_{1/3}$, Ta$_{2/3}$)O$_3$ or Ba$_x$(Mg$_{1/3}$, Ta$_{2/3}$)O$_3$ which in turn were granulated, pressed and sintered. Hence, c corresponds to invention (5), while d corresponds to invention (6).

Procedures for determining the Q-value, the relative dielectric constant ($\epsilon_r$) and the temperature coefficient of resonant frequency ($\tau_f$) were identical with those of Example 1.

The results of the measurements are collectively shown in FIG. 7 to FIG. 13. The values shown in FIG. 7 to FIG. 13 illustrate an average taken for 20 specimens in each sample number. In the ceramic dielectrics obtained by applying the method used in the present invention, it was then observed that the Q-value was kept to 10,000 or more at 8 GHz, the relative dielectric constant ($\epsilon_r$) had a high value of 28 or more, and the temperature coefficient of resonant frequency ($\tau_f$) also showed a value within a range of +20 to –10 ppm/°C.

(EXAMPLE 3)

By applying the methods of the present inventions (inventions (8) and (9)), ceramic dielectrics represented by: Ba$_x$(Zn$_{1/3}$, Ta$_{2/3}$)O$_3$+yMgTiO$_3$/SrTiO$_3$+zMnO/ZnO, and Ba$_x$(Mg$_{1/3}$, Ta$_{2/3}$)O$_3$+yMgTiO$_3$/SrTiO$_3$+zMnO/ZnO were formed and their electric characteristics (unloaded Q-value, relative dielectric constant $\epsilon_r$ and temperature coefficient $\tau_f$ of resonant frequency) were measured. As a comparison to the present inventions, alternative methods for obtaining ceramic dielectrics were conducted and measured by observing electric characteristics (unloaded Q-value, relative dielectric constant $\epsilon_r$ and temperature coefficient of resonant frequency $\epsilon_f$).

FIG. 14 to FIG. 18 show the values for x, y and z of the compositions, the sintering conditions and forming conditions. In the base sample column, ③ represents $Ba_x(Zn_{1/3}, Ta_{2/3})O_3$ and ④ represents $Ba_x(Mg_{1/3}, Ta_{2/3})O_3$. Furthermore, for y, (A1) represents a case of containing $MgTiO_3$, and (A2) represents a case of containing $SrTiO_3$. For z, (B1) represents a case of containing MnO and (B2) represents a case of containing ZnO. e in the forming conditions column represents that preparation of the raw materials for obtaining the predetermined composition, was conducted by using all the raw material powders and which were then calcined, granulated, pressed and sintered, while f demonstrates that the preparation of the raw materials was conducted by mixing the calcined powder of $MgTiO_3$ and/or $SrTiO_3$ to the calcined powder of $Ba_x(Zn_{1/3}, Ta_{2/3})O_3$ or $Ba_x(Mg_{1/3}, Ta_{2/3})O_3$ which in turn were granulated, pressed and sintered. Hence, e corresponds to the invention (8) above, while f corresponds to the invention (9) above.

Procedures for determining the Q-value, the relative dielectric constant ($\epsilon_r$) and the temperature coefficient of resonant frequency ($\tau_f$) were identical with those of Example 1.

The results of the measurements are collectively shown in FIG. 14 to FIG. 18. The values shown in FIG. 14 to FIG. 18 illustrate an average taken for 50 specimens in each sample number. In the ceramic dielectrics obtained by applying the method used in the present invention, it was then observed that the Q-value was kept to 10,000 or more at 8 GHz, the relative dielectric constant ($\epsilon_r$) was as high as 28 or more, and the temperature coefficient of resonant frequency ($\tau_f$) also showed a value within a range of +20 to −10 ppm/°C.

INDUSTRIAL APPLICABILITY

The ceramic dielectrics according to the present invention have a high unloaded Q-value and a high relative dielectric constant ($\epsilon_r$) and show a value within a range of +20 to −10 ppm/°C. also for the temperature coefficient of resonant frequency ($\tau_f$). Using the ceramic dielectrics, it is possible to provide ceramic components having a higher general purpose applicability than those that are presently used, for example, in electronic and electric equipment circuits.

The ceramic dielectrics have a lower sintering temperature range than usual and can be formed easily by applying the methods according to the present invention.

We claim:

1. A ceramic dielectric consisting essentially of a composition represented by: $Ba(M_{1/3}, Ta_{2/3})O_3+yCaTiO_3+zMnO/ZnO$ (in which M is Zn or Mg, MnO/ZnO means MnO and/or ZnO), wherein y and z each has a value satisfying the respective equations:

$$0<y \leq 0.3$$

$$0<z \leq 0.05.$$

2. A method of forming the ceramic dielectric defined in claim 1, which comprises the steps of adding one or more powders selected from compounds containing Mn and/or Zn as additives to a mixture of compounds containing Ba, Zn or Mg, Ta, Ca and Ti respectively as a raw material powder, mixing and pressing the powders such that, after sintering, they provide a composition represented by: $Ba(M_{1/3}, Ta_{2/3})O_3+yCaTiO_3+zMnO/ZnO$ (in which M is Zn or Mg, MnO/ZnO means MnO and/or ZnO, y and z each respectively represents a value within a range: $0<y \leq 0.3$, $0<z \leq 0.05$) and then sintering them in the air or an oxygen atmosphere at a temperature of 1300° to 1650° C.

3. A method of forming the ceramic dielectric defined in claim 1, which comprises the steps of mixing a calcined powder of a mixture of compounds containing Ba, Zn or Mg and Ta respectively and a calcined powder of a mixture of compounds containing Ca and Ti respectively, subsequently adding one or more powders selected from compounds containing Mn and/or Zn as additives to the mixed calcined powder, mixing and pressing the powders such that, after sintering, they provide a composition represented by: $Ba(M_{1/3}, Ta_{2/3})O_3+yCaTiO_3+zMnO/ZnO$ (in which M is Zn or Mg, MnO/ZnO means MnO and/or ZnO, y and z each respectively represents a value within a range: $0<y \leq 0.3$, $0<z \leq 0.05$) and then sintering them in the air or an oxygen atmosphere at a temperature of 1300° to 1650° C.

4. A ceramic dielectric consisting essentially of a composition represented by: $Ba_x(M_{1/3}, Ta_{2/3})O_3+yCaTiO_3+zSiO_2/B_2O_3$ (in which M is Zn or Mg, $SiO_2/B_2O_3$ means $SiO_2$ and/or $B_2O_3$), wherein x, y and z each has a value satisfying the respective equations:

$$0.9 \leq x \leq 1.1$$

$$0<y \leq 0.3$$

$$0<z \leq 0.055.$$

5. A method of forming the ceramic dielectric defined in claim 4, which comprises the steps of adding one or more powders selected from compounds containing Si and/or B as additives to a mixture of compounds containing Ba, Zn or Mg, Ta, Ca and Ti respectively as a raw material powder, mixing and pressing the powders such that, after sintering, they provide a composition represented by: $Ba_x(M_{1/3}, Ta_{2/3})O_3+yCaTiO_3+zSiO_2/B_2O_3$ (in which M is Zn or Mg, $SiO_2/B_2O_3$ means $SiO_2$ and/or $B_2O_3$. x, y and z each respectively represents a value within a range: $0.9 \leq x \leq 1.1$, $0<y \leq 0.3$, $0<z \leq 0.05$) and then sintering them in the air or an oxygen atmosphere at a temperature of 1200° to 1600° C.

6. A method of forming the ceramic dielectric defined in claim 4, which comprises the steps of mixing a calcined powder of a mixture of compounds containing Ba, Zn or Mg and Ta respectively and a calcined powder of a mixture of compounds containing Ca and Ti respectively, subsequently adding one or more powders selected from compounds containing Si and/or B as additives to the mixed calcined powder, mixing and pressing the powders such that, after sintering, they provide a composition represented by: $Ba_x(M_{1/3}, Ta_{2/3})O_3+yCaTiO_3+zSiO_2/B_2O_3$ (in which M is Zn or Mg, $SiO_2/B_2O_3$ means $SiO_2$ and/or $B_2O_3$. x, y and z each respectively represents a value within a range: $0.9 \leq x \leq 1.1$, $0<y \leq 0.3$, $0<z \leq 0.05$) and then sintering them in the air or an oxygen atmosphere at a temperature of 1200° to 1600° C.

7. A ceramic dielectric consisting essentially of a composition represented by: $Ba_x(M_{1/3}, Ta_{2/3})O_3+yMgTiO_3/SrTiO_3+zMnO/ZnO$ (in which M is Zn or Mg, $MgTiO_3/SrTiO_3$ means $MgTiO_3$ and/or $SrTiO_3$, MnO/ZnO means MnO and/or ZnO), wherein x, y and z each has a value satisfying the respective equations:

$$0.9 \leq x \leq 1.1$$

$$0<y \leq 0.3$$

$$0 \leq z \leq 0.05.$$

8. A method of forming the ceramic dielectric defined in claim 7, which comprises the steps of adding one or more powders selected from compounds containing Mn and/or Zn as additives to a mixture of compounds containing Ba, Zn or Mg, Ta, Mg and/or Sr and Ti respectively as a raw material powder, mixing and pressing the powders such that, after sintering, they provide a composition represented by: $Ba_x(M_{1/3}, Ta_{2/3})O_3+yMgTiO_3/SrTiO_3+zMnO/ZnO$ (in which M is Zn or Mg, $MgTiO_3/SrTiO_3$ means $MgTiO_3$ and/or $SrTiO_3$, MnO/ZnO means MnO and/or ZnO, x, y and z each respectively represents a value within a range: $0.9 \leq x \leq 1.1$, $0 < y \leq 0.3$, $0 \leq z \leq 0.05$) and then sintering them in the air or an oxygen atmosphere at a temperature of 1300° to 1600° C.

9. A method of forming the ceramic dielectric defined in claim 7, which comprises the steps of mixing a calcined powder of a mixture of compounds containing Ba, Zn or Mg and Ta respectively and a calcined powder of a mixture of compounds containing Mg and/or Sr, and Ti respectively, subsequently adding one or more powders selected from compounds containing Mn and/or Zn as additives to the mixed calcined powder, mixing and pressing the powders such that, after sintering, they provide a composition represented by: $Ba_x(M_{1/3}, Ta_{2/3})O_3+yMgTiO_3/SrTiO_3+zMnO/ZnO$ (in which M is Zn or Mg, $MgTiO_3/SrTiO_3$ means $MgTiO_3$ and/or $SrTiO_3$, MnO/ZnO means MnO and/or ZnO, x, y and z each respectively represents a value within a range: $0.9 \leq x \leq 1.1$, $0 < y \leq 0.3$, $0 \leq z \leq 0.05$) and then sintering them in the air or an oxygen atmosphere at a temperature of 1300° to 1600° C.

* * * * *